Dec. 21, 1965   R. L. BURNS ETAL   3,224,592
OIL FILTER FOR AN INTERNAL-COMBUSTION ENGINE
Filed Sept. 4, 1963
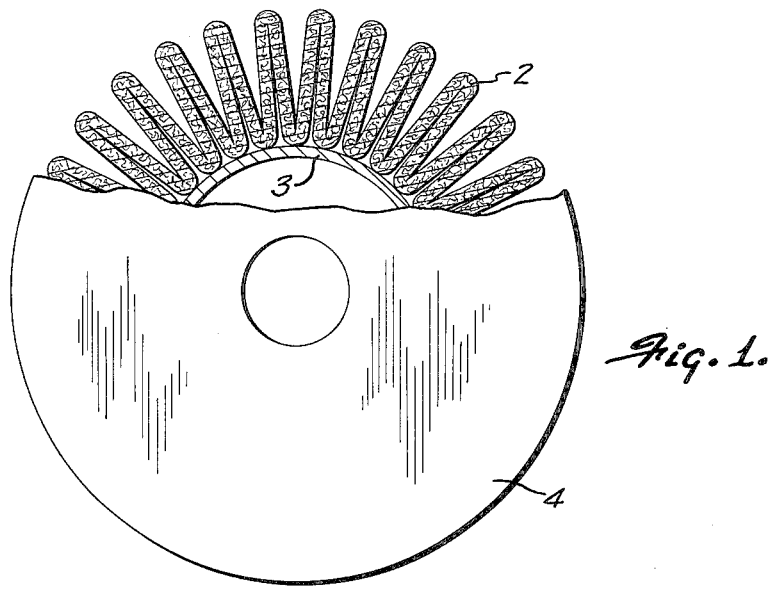
Fig. 1.
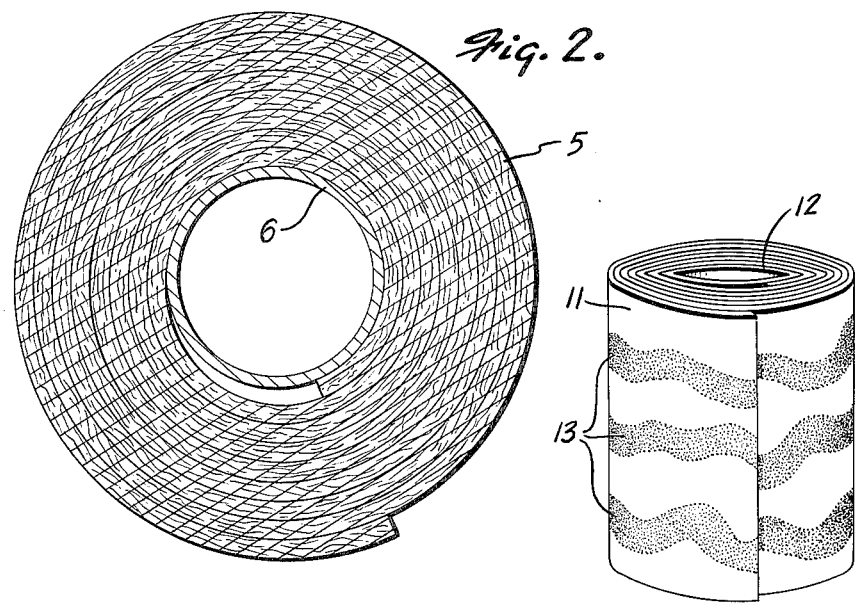
Fig. 2.
Fig. 4.
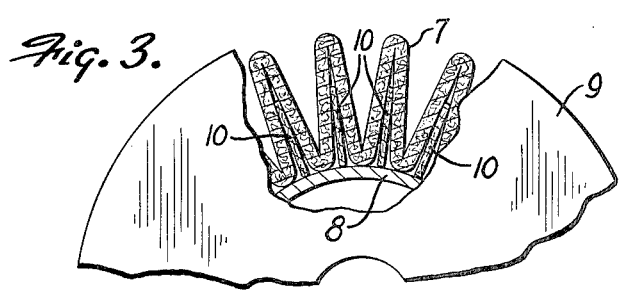
Fig. 3.
INVENTORS.
ROBERT L. BURNS
GERALD R. VAN DUZEE
BY *Andrus & Starke*
ATTORNEYS

United States Patent Office 3,224,592
Patented Dec. 21, 1965

3,224,592
OIL FILTER FOR AN INTERNAL-COMBUSTION ENGINE
Robert L. Burns, 401 Winsor Drive, Antioch, Ill., and Gerald R. Van Duzee, 50 Rolling Wood Drive, Trumbull, Conn.
Filed Sept. 4, 1963, Ser. No. 306,456
5 Claims. (Cl. 210—493)

This invention relates to a filter and more particularly to an oil filter for an internal-combustion engine.

Lubricating oils tend to oxidize under conditions encountered in diesel and automotive engines and the oxidation products formed in the oil, being acidic, tend to corrode the metal surfaces with which they are in contact. Oxidation of the oil also forms sludge, lacquer and resinous materials which are deposited on the engine parts so that the operating efficiency of the engine is lowered. To counteract this problem it has been the practice to add small amounts of chemical agents known as anti-oxidants to motor oils which have the ability to inhibit the formation of acidic products in the oil. In addition, agents have also been developed which are capable of preventing the deposition of lacquer and sludge on the engine parts so that longer and more efficient operation of the engine is obtained.

It has been proposed in the past to add magnesium alloys to motor oils for internal-combustion engines, and the magnesium serves as an antioxidant to reduce the engine oil acidity and thereby increase engine wear and resist sludge formation. One method of adding magnesium to the motor oil is to disperse finely ground magnesium powder in the oil. However, even with the use of dispersing agents, the magnesium powder tends to settle out of the oil with the result that the magnesium is not uniformly distributed throughout the oil after periods of use and thus the effectiveness of the magnesium is minimized.

It has also been proposed to place a solid magnesium alloy rod in the oil system of an internal-combustion engine. While the magnesium rod will initially aid in reducing the acidity of the engine, the surface of the solid rod is quickly contaminated with the result that the action of the magnesium rod is substantially reduced or minimized within a short period of engine use.

The present invention is directed to a filter for an oil system such as used in an internal-combustion engine, The filter is formed of a fibrous material coated or impregnated with magnesium particles, either in the form of fine fibers or powder. The magnesium in this finely divided form provides an increased surface area for contact with the oil passing through the filter and acts to reduce the acidity of the lubricating oil for extended periods of time.

The fibrous filtering material to be used in the filter is generally more porous than the normal filtering material and the magnesium coating tends to close off or restrict the porosity of the material so that the coated filter material has a porosity similar to conventional materials. During use, the magnesium will react with the components of the oil and the magnesium will erode away and the erosion will tend to increase the porosity of the filter. This increase in porosity due to the erosion of the magnesium opposes the normal clogging action by foreign particles so that the normal porosity of the filter is maintained for long periods of use.

Other objects and advantages will appear in the course of the following description.

The drawings illustrate the best mode presently contemplated in carrying out the invention.

In the drawings:

FIG. 1 is a plan view with parts broken away of a pleated filter incorporating the filter element of the invention;

FIG. 2 is a plan view of a modified form of the invention in which the filter element is disposed in spiral form;

FIG. 3 is a second modified form of the invention in which separate strips of magnesium coated paper are located within a pleated filter; and FIG. 4 shows another modified form of the invention in which the magnesium particles are applied in spaced stripes on the wound filter element.

Internal-combustion engines are lubricated by oil which is taken from the crankcase and forced by an oil pump to the various parts to be lubricated and the oil then drains back into the crankcase. In the ordinary operation of internal-combustion engines, the oil becomes contaminated with carbon, road dust, and metal particles abraded from the moving surfaces of the engine. To lessen the frequency of oil changes the engine is normally provided with an oil filter through which the oil from the crankcase is continuously circulated while the engine is running for the purpose of removing the solid particles from the oil. The filter elements or sheets have a uniform capillary structure which is designed for efficient clarification and removal of particles from the oil with a minimum resistance to passage of the oil. The effective life of the element is limited by the coating of foreign material built up on its surface and the capacity of the filter element to remove the foreign material is directly proportional to the area of its surface.

FIG. 1 illustrates a conventional pleated filter 1 for use in the hydraulic system of an internal-combustion engine. The filter comprises a pleated filter element 2 which is arranged in the form of an annulus about a perforated central tube 3. The filter is preferably provided with end caps 4 which are bonded to the opposite ends of the pleated filter element 2 and the end caps have a center hole to receive the usual filter bolts.

According to the invention, the filter element 2 is formed of a fibrous material which may take the form of vegetable fibers, such as cellulose or cotton, mineral fibers such as glass or asbestos, animal fibers such as wool, or synthetic fibers such as nylon or rayon. The fibrous material is normally in the form of a mat in which the fibers are haphazardly arranged in one or more layers. However, in some cases the fibers may be in the form of woven fabric, braiding or other forms.

When using cellulose fibers or paper as the filtering element, a thermosetting resin coating is usually applied to the cellulose fibers to improve the wet strength. The resin which is applied to the paper can take the form of phenol-formaldehyde, melamine-formaldehyde, urea-formaldehyde, vinyl chloride-vinylidene chloride copolymers, and the like.

According to the invention, finely divided particles of a magnesium alloy are applied to the filter element 2. While pure magnesium can be used, magnesium is normally sold in the form of magnesium base alloys containing up to 10% aluminum and/or zinc. A typical magnesium alloy which can be used is ASTM-AZ61 which contains 93% magnesium, 6% aluminum and 1% zinc. In addition, magnesium-calcium alloys can be used. This type of alloy generally contains from 5 to 35% calcium and the balance magnesium. Specific examples of a magnesium-calcium alloy are 15.4% calcium and 84.6% magnesium or 34.4% calcium and 65.6% magnesium. The term "magnesium" as used in the specification and claims is intended to cover pure magnesium as well as magnesium base alloys such as those described above.

The magnesium particles may be applied to one side or both sides of the filter element 2 or embedded within the fibrous filtering element. If the filtering element 2 is formed of a series of laminated layers, the magnesium can be applied to one or both sides of each layer. Moreover, the magnesium can be applied over the entire surface of one or both sides of the filtering element or it can be applied at spaced intervals in any desired pattern.

The magnesium can be applied to the filter element 2 by several different processes. For example, the magnesium can be applied to the filter element 2 by a metallizing gun. With this type of device, magnesium wire is automatically fed to an electric arc which melts the magnesium and deposits the same in the form of small droplets or particles.

The magnesium can also be applied to the filter element 2 in the form of fibers or powder. The magnesium fibers generally have a diameter in the range of .001 to .003 inch and can have any desired length.

The magnesium fibers can be applied to the filter element 2 in any one of a number of ways. For example, the magnesium fibers may be applied to the surface of the paper filter element after the paper is treated with the resinous binder and the magnesium fibers can then be rolled into the binder. On curing of the resin, the fibers will be integrally bonded to the filter element.

As an alternate method, the cellulose fibers and magnesium fibers can be mixed as a slurry with water. The slurry can then be deposited on a screen or other perforated support and the water removed by vacuum treatment to leave the magnesium fibers uniformly dispersed throughout the cellulose fiber mass. In other cases, the slurry can be run through a Fourdrinier paper-making machine to remove the water.

The magnesium fibers can also be driven or forced into the finished cellulose filter element 2 by using air, water or centrifugal force.

Magnesium powder can be used along with, or in place of, the magnesium fibers. In this case the powder should preferably have a particle size in the range of 100 to 400 mesh and may applied to the fibrous filtering element 2 in the manner described with respect to the magnesium fibers.

The amount of magnesium used with the filtering element 2 depends on the particular application and the size of the engine and hydraulic system. In general, .001 to .005 ounce of magnesium can be used per square inch of surface area of the filter element 2, with about .003 ounce per square inch being preferred. Generally, it has been found that the filter element, when used with an automotive oil system, should contain from .05 to .10 of a pound of magnesium. For an eight-cylinder engine, the amount of magnesium will be in the higher portion of this range, with about 0.10 pound being preferred, while for a six-cylinder engine, the amount of magnesium will be in the lower portion of the range, with about .07 pound being preferred.

During operation, the flexible fibrous filter will flex and small particles of the magnesium will break off and expose additional surface area of the magnesium for contact with the oil. In addition, as the magnesium is corroded away by virtue of reaction with the oil constituents, the porosity of the filter tends to increase which conteracts the clogging of the filter by foreign particles, resulting in the filter having a longer service life.

As an example of the efficiency of the oil filter of the invention in reducing engine acidity, 0.10 pound of magnesium alloy containing 6% aluminum and 1% zinc was applied to the upstream surface of a cellulose fiber oil filter. The filter was installed in an eight-cylinder automobile engine and in driving 69 miles, the pH of the oil was increased from 3.8 to 5.5.

FIG. 2 shows a modified form of the invention in which the filter includes a filter element 5 which is wound in a spiral manner around a central core 6. The filter element 5 is substantially the same as the filter element 2 described with respect to the first embodiment.

FIG. 3 shows a second modified form of the invention in which auxiliary strips of fibrous material containing magnesium particles are used in the filter. In this embodiment, the filter comprises a pleated filter element 7 which is located around a central perforated tube 8 and caps 9 are attached to opposite ends of the pleated filter element. In this embodiment, a series of strips of fibrous material 10 are located within the pleats of filter element 7. The filter element 7 and strips 10 can be composed of paper or other fibrous materials previously described with respect to filter element 2. The strips 10 are coated or impregnated with magnesium particles, such as magnesium powder or fibers. The magnesium is applied to the strips 10 in the manner described with respect to the filter element 2, and the strips 10 function in the manner similar to the filter element 2 and serve to reduce the acidity of the oil and thereby decrease engine wear.

FIG. 4 shows a filter element 11 wound in a spiral or circumferential manner about a central core 12. The element 5 is formed of a fibrous material similar to that used for filter element 2 and in this case one surface of the element 12 is coated with a series of spaced stripes of magnesium particles 13. The magnesium can be applied to the element in the manner set forth with respect to the first embodiment and can be applied as small fibers, powder or the like. With this construction, a portion of the filter element is not coated, and will have its normal filtering characteristics.

The stripes 13 are preferably applied in a non-regular pattern so that when the element is wound on itself, the stripes or other areas of magnesium coating will not be in direct alignment. Thus, oil passing through all portions of the filter will contact areas of the magnesium.

The invention can also be used with other types of fibrous filters. For example, rather than fabricating the fibrous material in the form of strips and forming a pleated or spiral element, as shown in FIGS. 1 and 2, the fibrous material can merely be placed in a haphazard manner in a perforated container and the magnesium can be applied to this fiber mass in the manner described above.

While it is preferred to apply the magnesium to a fibrous filter, the magnesium can in some cases be applied to other types of filters, such as aluminum, porcelain, steel, glass and the like. However, with filters of this type, a centrifuge will normally have to be positioned in the oil system ahead of the filter with the centrifuge operating at a pressure high enough to remove the scum from the magnesium particles and bare the magnesium surfaces for further de-acidizing action.

Various modes of carrying out the invention are contemplated as being within the scope of the following claims particularly pointing out and distinctly claiming the subject matter which is regarded as the invention.

We claim:

1. In an oil filter for an internal-combustion engine, a filter element composed of a fibrous material disposed in overlapping layers, and a coating of finely divided magnesium disposed on at least one surface of the filter element, said magnesium being applied to said filter element at spaced locations whereby a portion of said surface of the filter element is coated with the magnesium and the second portion of said surface of the filter element is exposed and the locations of magnesium being substantially out of direct alignment in adjacent overlapping layers.

2. In an oil filter for an internal-combustion engine, a filter element having a series of overlapping layers and a plurality of fibrous members separate from said element and disposed contiguous to adjacent overlapping layers of said element, said fibrous members containing finely divided particles of magnesium tending to react with the oil passing through the filter element to reduce the acidity of the oil and decrease engine wear.

3. In an oil filter for an internal-combustion engine, a pleated filter element including a series of radially extending folds, and a plurality of fibrous strips disposed flatwise in contiguous relation to adjacent folds of the filter element, said strips containing spray-deposited particles of magnesium with said magnesium tending to react with the oil passing through the filter element to reduce the acidity of the oil and decrease engine wear.

4. In an oil filter for an internal-combustion engine, a filter element composed of fibrous material and wrapped circumferentially, and a coating of finely divided magnesium disposed on at least one surface of the filter element, said magnesium being applied to said filter element at spaced locations whereby a portion of said surface of the filter element is coated with the magnesium and a second portion of said surface of the filter element is exposed, and the locations of the magnesium coating are out of direct alignment when the element is wrapped.

5. The structure of claim 4 in which the magnesium is applied to the filter element by spray coating.

References Cited by the Examiner

UNITED STATES PATENTS

| | | |
|---|---|---|
| 2,395,449 | 2/1946 | Briggs. |
| 2,785,805 | 3/1957 | Hough. |
| 2,870,689 | 1/1959 | Brennan _ _ _ _ _ _ _ 162—156 XR |
| 3,065,856 | 11/1962 | Goldman _ _ _ _ _ _ _ _ _ _ 210—494 |

FOREIGN PATENTS 166,379  12/1955  Australia.

OTHER REFERENCES

"Now—Metallic Paper," Chemical & Eng. News, vol. 35, June 3, 1957, page 97.

MORRIS O. WOLK, *Primary Examiner.*